(12) United States Patent
Ota

(10) Patent No.: US 7,657,878 B2
(45) Date of Patent: Feb. 2, 2010

(54) COMPILER, METHOD OF COMPILING AND PROGRAM DEVELOPMENT TOOL

(75) Inventor: Yutaka Ota, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 748 days.

(21) Appl. No.: 10/807,374

(22) Filed: Mar. 24, 2004

(65) Prior Publication Data

US 2004/0243988 A1 Dec. 2, 2004

(30) Foreign Application Priority Data

Mar. 26, 2003 (JP) ............................. 2003-085848

(51) Int. Cl.
*G06F 9/45* (2006.01)
(52) U.S. Cl. ........................ 717/143; 717/142; 717/151
(58) Field of Classification Search ......... 717/140–144, 717/151–154
See application file for complete search history.

(56) References Cited

U.S. PATENT DOCUMENTS

| | | | | |
|---|---|---|---|---|
| 4,302,820 | A * | 11/1981 | Struger et al. ............... | 712/248 |
| 6,091,896 | A * | 7/2000 | Curreri et al. ............... | 717/125 |
| 6,247,174 | B1 * | 6/2001 | Santhanam et al. ......... | 717/154 |
| 6,701,515 | B1 * | 3/2004 | Wilson et al. ............... | 717/117 |
| 2002/0019973 | A1 * | 2/2002 | Hayashida ................... | 717/106 |
| 2003/0074654 | A1 * | 4/2003 | Goodwin et al. ............. | 717/161 |

FOREIGN PATENT DOCUMENTS

JP 2002-24029 1/2002

OTHER PUBLICATIONS

Loveman, "The DEC High Performance Fortran 90 Compiler Front End", 1995, IEEE, pp. 46-53.*
U.S. Appl. No. 11/362,125, filed Feb. 27, 2006, Nishi, et al.

* cited by examiner

*Primary Examiner*—Ted T Vo
(74) *Attorney, Agent, or Firm*—Oblon, Spivak, McClelland, Maier & Neustadt, L.L.P.

(57) ABSTRACT

A compiler includes: a syntax analyzer analyzing whether or not an operation described in a source program conforms to grammatical rules, and analyzing whether or not a combination of the operations defines an intrinsic function and details of processing operations of the intrinsic function; an intrinsic function definition database storing a definition of the intrinsic function and the details of the processing operations of the intrinsic function, as analyzed by the syntax analyzer; a code generator generating machine instructions from the source program based on a result of the processing of the syntax analyzer; and a code optimizer optimizing the machine instructions to machine instructions corresponding to the details of the processing operations of the intrinsic function, if a string of the machine instructions generated by the code generator are in agreement with the details of the processing operations of the intrinsic function stored in the intrinsic function definition database.

20 Claims, 18 Drawing Sheets

FIG. 1A
PRIOR ART

```
_asm int uci(int _reg_src, unsigned char _imm);        ·····(F91)
        ⋮ a = uci(b, 255);                                       ·····(T91)
        ⋮ a = (b+10) & 255;                                      ·····(T92)
```

FIG. 1B
PRIOR ART

```
uci $0, $1, 255                                        ·····(M91)
        ⋮ add $3, $1, 10                                     ⎫
add $0, $3, 255                                    ⎬ ·····(M92)
                                                   ⎭
```

FIG. 5A

```
/* DEFINITION OF INTRINSIC FUNCTION (#num1) */
_asm int uci(int_reg_src, unsigned char_imm) {
    return (_reg_src + 10) &_imm;
}
```
F11, P11

FIG. 5B

```
/* DEFINITION OF INTRINSIC FUNCTION (#num2) */
_asm int uci(int_reg_src, unsigned char_imm) {
    int tmp = _reg_src + 10;
    tmp & = _imm;
    return tmp;
}
```
F12, P12

FIG. 6A

```
/* EXPLICIT CALL OF INTRINSIC FUNCTION */
int a, b;
a = uci( b, 255);                    .....(T11)
a = uci(a, 127);                     .....(T12)
```

FIG. 6B

```
uci $0, $1, 255                      .....(M11)
uci $0, $0, 127                      .....(M12)
```

FIG. 7A

```
int a, b;
a = (b+10) &255;                    ·····(T21)
a = (a+10) &127;                    ·····(T22)
```

FIG. 7B

```
add $3, $1, 10      ⎫
add $0, $3, 255     ⎬ ·····(M21)
add $4, $0, 10      ⎫
add $0, $4, 127     ⎬ ·····(M22)
```

FIG. 7C

```
uci $0, $1, 255                     ·····(M23)
uci $0, $0, 127                     ·····(M24)
```

FIG. 11

```
/* FIRST EMBODIMENT */                                          F11
/* DEFINITION OF INTRINSIC FUNCTION (#num 1) */
    _asm int uci (int_reg_src,unsigned char_imm)  {
        return (_reg_src + 10) &_imm;
                                                                P11
    }

/* DEFINITION OF INTRINSIC FUNCTION (#num 2) */
    _asm int uci (int_reg_src,unsigned char_imm)  {
        int tmp = _reg_src + 10;
        tmp & = _imm;
        return tmp;                                             P12
    } int a;
unsigned char b;                                                F12
void test (void)  {
        a = uci(b, 255);              ·····(T31)
        }
void test2 (void)  {
        a = (b + 10) &127;            ·····(T32)
        }
```

FIG. 12

```
_test:
    lbu    $12, %sdaoff(_b) ($14)
    uci    $11, $12, 255              ·····(M31)
    sw     $11, %sdaoff(_a) ($14)
    ret _test2:
    lbu    $12, %sdaoff(_b) ($14)
    uci    $11, $12, 127              ·····(M32)
    sw     $11, %sdaoff(_a) ($14)
    ret
```

FIG. 13

```
module uci (
meucEUCICode,
meucEUCIRn
meucEUCIRm,
meucEUCIResult
);
input [15:0] meucEUCICode;
input [31:0] meucEUCIRn;
input [31:0] meucEUCIRm;
output [31:0] meucEUCIResult;                          P41 assign meucEUCIResult
   = (meucEUCIRm + 32'h0000000a) & { { 16 {1'b0} } , meucEUCICode } ;

endmodule
```

FIG. 14

```
module uci (
meucEUCICode,
meucEUCIRn
meucEUCIRm,
meucEUCIResult
);
input [15:0] meucEUCICode;
input [31:0] meucEUCIRn;
input [31:0] meucEUCIRm;
output [31:0] meucEUCIResult;

wire [31:0] tmp;
wire [31:0] imm;                                        P42 assign tmp = meucEUCIRm + 32'h0000000a;
assign imm = { {16 {1'b0} } ,meucEUCICode } ;
assign meucEUCIResult = tmp & imm;

endmodule
```

FIG. 15A

```
/* SECOND EMBODIMENT */
#pragma input HDL add10_and_1.V          ·····(H41)
#pragma input HDL add10_and_2.V          ·····(H42)
int a;
unsigned char b;
void test(void) {
    a = uci( b, 255);                    ·····(T41)
    }
void test2(void) {
    a = (b + 10) & 127;                  ·····(T42)
    }
```

FIG. 15B

```
_test:
    lbu    $12, %sdaoff(_b) ($14)
    uci    $11, $12, 255                 ·····(M41)
    sw     $11, %sdaoff(_a) ($14)
    ret
_test2:
    lbu    $12, %sdaoff(_b) ($14)
    uci    $11, $12, 127                 ·····(M42)
    sw     $11, %sdaoff(_a) ($14)
    ret
```

US 7,657,878 B2

COMPILER, METHOD OF COMPILING AND PROGRAM DEVELOPMENT TOOL

CROSS REFERENCE TO RELATED APPLICATIONS

This application claims benefit of priority under 35 USC §119 to Japanese Patent Application No. 2003-085848 filed on Mar. 26, 2003, the entire contents of which are incorporated by reference herein.

BACKGROUND OF THE INVENTION

1. Field of the Invention

The present invention pertains to a compiler and a method of compiling for generating object code described by a machine language from a source program described by a programming language, and a program development tool having the compiler. In particular, the present invention pertains to a technology for building the function defined expansion specifications by a user into the compiler.

2. Description of the Related Art

In general, since a compiler for generating object code described by a machine language from a source program had varied depending on processor architecture, and the processing procedure of intrinsic function had been also built into the compiler, it was impossible for a user to modify the intrinsic function individually. Therefore, in order to execute an application program etc. on the processor expandable (configurable) user specifications such as the processor architecture and an instruction set, a compiler corresponding to the user expansion specifications had been needed.

For this reason, the present applicant proposed a compiler in which the user can customize the intrinsic function according to the user expansion specifications, in Japanese Patent Laid Open Publication (Kokai) No. 2002-24029.

According to the compiler disclosed in above publication, however, even if instruction statements for executing a processing operation equivalent to a processing operation by using the intrinsic function defined by the user are described by the programming language in the source program, it was impossible to convert the instruction statements to the machine language according to the user-defined intrinsic function defined by the user (user-defined intrinsic function).

For example, when an intrinsic function "uci" (F91) for executing processing operations to add "10" to a source register and store the value masked by "_imm" in a destination register is declared into a source program as shown in FIG. 1A, the compiler can convert from an instruction statement T91 calling explicitly the intrinsic function "uci" in the source program to a machine language (machine language M91 shown in FIG. 1B) by using the instruction "uci" according to the user-definition.

However, even if an instruction statement T92 for executing processing operations equivalent to the processing operations (processing operation to add "10" to the source register and store the value masked by "_imm" in the destination register) which the instruction statement T91 executes by using the intrinsic function "uci", is described in the source program, the compiler cannot convert the instruction statement T92 to the machine language by using the instruction "uci" defined by the user. As a result, the compiler generates conventional machine language (machine language M92 in FIG. 1B) by using the conventional instruction "add". In order to generate the machine language by using instruction "uci" defined by the user from the instruction statement T92, the user needs to rewrite the description of the instruction statement T92 to the instruction statement T91 which explicitly calls the intrinsic function "uci".

Thus, the user had needed to have full knowledge about the user-defined intrinsic function during the describing of the source program. The user further had needed to rewrite the applicable portion of the operations among the description of the source program to the user-defined instruction function, when the specifications of the processor were extended. Therefore, it was the problem that enormous amounts of time and cost were required in the design of the processor and/or its application programs.

SUMMARY OF THE INVENTION

A compiler for generating object code from an input source program according to a embodiment of the present invention includes: a syntax analyzer configured to analyze whether or not an operation described in the source program conforms to grammatical rules, and to analyze whether or not a combination of the operations defines an intrinsic function and details of processing operations of the intrinsic function; an intrinsic function definition database configured to store a definition of the intrinsic function and the details of the processing operations of the intrinsic function, as analyzed by the syntax analyzer; a code generator configured to generate machine instructions from the source program based on a result of the processing of the syntax analyzer; and a code optimizer configured to optimize the machine instructions to machine instructions corresponding to the details of the processing operations of the intrinsic function, in a case where a string of the machine instructions generated by the code generator are in agreement with the details of the processing operations of the intrinsic function stored in the intrinsic function definition database.

Furthermore, a computer implemented method of compiling for generating object code from an input source program according to an embodiment of the present invention includes: analyzing, by a syntax analyzer, whether or not an operation described in the source program conforms to grammatical rules, and analyzing, by the syntax analyzer, whether or not a combination of the operations defines an intrinsic function and details of processing operations of the intrinsic function; storing a definition of the intrinsic function and the details of the processing operations of the intrinsic function, as analyzed by the syntax analyzer in an intrinsic function definition database; generating, by a code generator, machine instructions from the source program based on a result of the processing of the syntax analyzer; and optimizing, by a code optimizer, the machine instructions to machine instructions corresponding to the details of the processing operations of the intrinsic function, in a case where a string of the machine instructions generated by the code generator are in agreement with the details of the processing operations of the intrinsic function stored in the intrinsic function definition database.

Moreover, a program development tool for designing an application program for a processor installed user-defined hardware according to an embodiment of the present invention includes: a compiler for generating object code from the application program; and a simulator configured to debug the application program compiled by the compiler. Further, the compiler includes: a lexical analyzer configured to divide an operation described in the application program into tokens; a syntax analyzer configured to analyze whether or not the tokens conform to grammatical rules, and to input a hardware definition of a user-defined instruction and convert the input hardware definition into a definition of the intrinsic function and details of processing operations of the intrinsic function;

an intrinsic function definition database configured to store the definition of the intrinsic function and the details of the processing operations of the intrinsic function, converted by the syntax analyzer; a code generator configured to generate machine instructions from the application program based on a result of the processing of the lexical analyzer and a result of processing of the syntax analyzer; and a code optimizer configured to optimize the machine instructions to machine instructions corresponding to the details of the processing operations of the intrinsic function, in a case where a string of the machine instructions generated by the code generator are in agreement with the details of the processing operations of the intrinsic function stored in the intrinsic function definition database.

BRIEF DESCRIPTION OF THE DRAWINGS

FIG. 1A shows an example of description of a typical source program, and FIG. 1B shows an example of object code generated as a result of compiling the source program shown in FIG. 1A.

FIGS. 5A and 5B show examples of a user-defined intrinsic function described by using C programming language. FIG. 5A shows an example of a first definition of the user-defined intrinsic function, and FIG. 5B shows an example of a second definition of the user-defined intrinsic function.

FIG. 6A shows an example of description of a string of instructions for calling explicitly the user-defined intrinsic function shown in FIG. 5, and FIG. 6B shows an example of a string of machine instructions generated from the string of instructions shown in FIG. 6A.

FIG. 7A shows an example of a string of instructions which performs processing operations equivalent to the user-defined intrinsic functions shown in FIGS. 5A and 5B. FIG. 7B shows an example of a string of machine instructions without being optimized, generated from the string of instructions shown in FIG. 7A. FIG. 7C shows an example of a string of machine instructions after the optimization generated from the string of instructions shown in FIG. 7A.

FIG. 11 shows an example of description of a source program compiled by the compiler according to the first embodiment.

FIG. 12 shows an example of object code generated as a result of compiling the source program shown in FIG. 11 by using the compiler according to the first embodiment.

FIG. 13 shows an example the user-defined intrinsic function described by using hardware description language (VerilogHDL).

FIG. 14 shows an example the user-defined intrinsic function described by using hardware description language (VerilogHDL).

FIG. 15A shows an example of description of a source program compiled by a compiler according to the second embodiment. FIG. 15B shows an example of object code generated as a result of compiling the source program shown in FIG. 15A by using the compiler according to the second embodiment.

DETAILED DESCRIPTION

Figure 2:
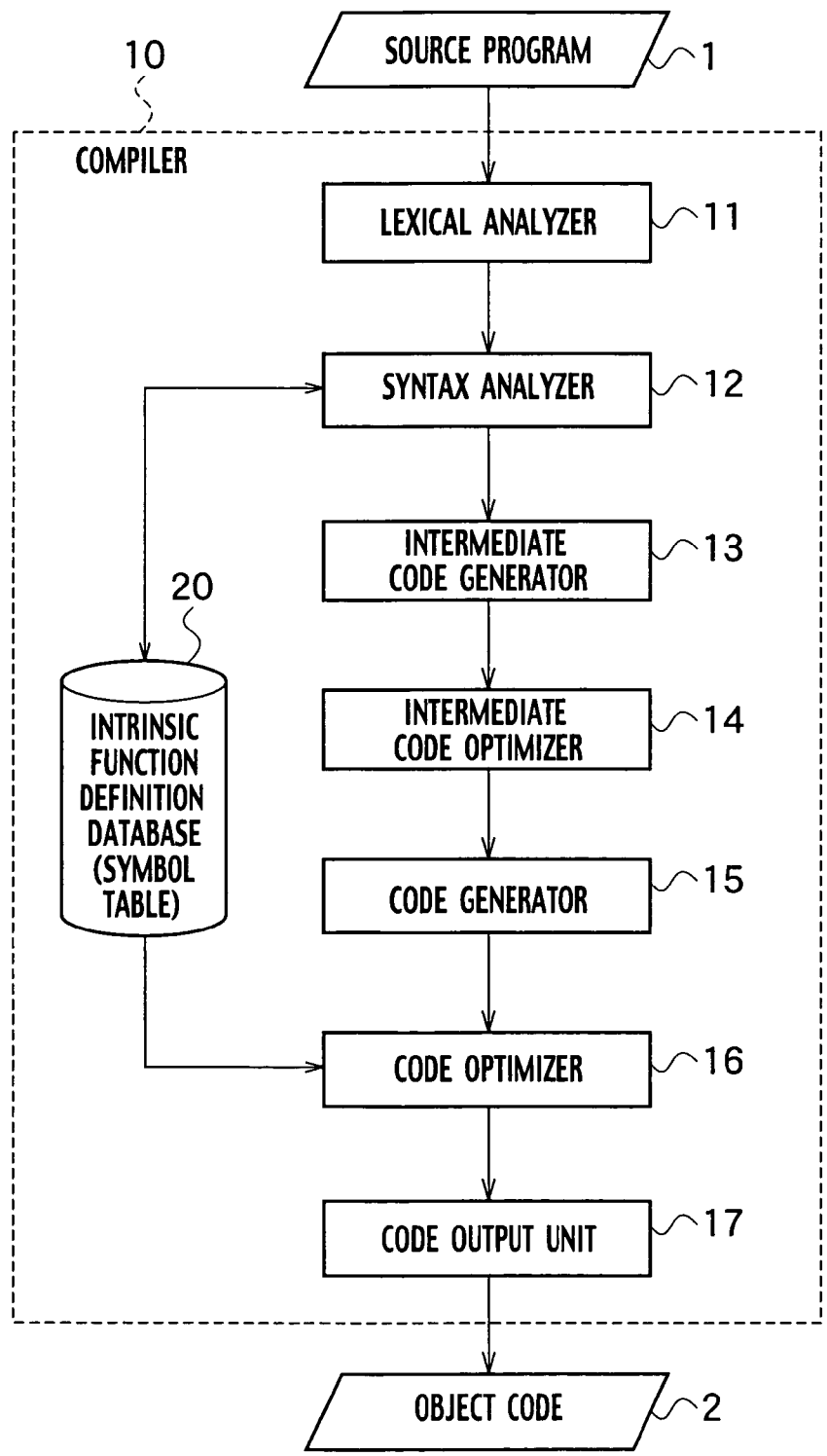
FIG. 2 is a simplified block diagram showing an example of the configuration of a compiler according to the first to third embodiments of the present invention.

Various embodiments of the present invention will be described herein below with reference to the accompanying drawings. It is to be noted that the same or similar reference numerals are applied to the same or similar parts and elements throughout the drawings, and the description of the same or similar parts and elements will be omitted or simplified.

FIG. 2 is a simplified block diagram showing an example of the configuration of a compiler 10 according to the first to third embodiments of the present invention. The compiler 10 is a translation program for translating a source program 1 described by using programming language into machine language, and is installed in a computer system such as a program development tool for developing application programs. The compiler 10 includes a lexical analyzer 11, a syntax analyzer 12, an intermediate code generator 13, an intermediate code optimizer 14, a code generator 15, a code optimizer 16 and a code output unit 17.

First, the lexical analyzer 11 inputs the source program 1, and then performs lexical analysis. The lexical analyzer 11 performs "lexical analysis" for dividing instruction statements described in the source program 1 by using a high-level programming language into "tokens" which is the minimum significant units. The representative examples of the "tokens" are keywords, operators, variables, constants, symbols and the like in the programming language.

Next, the syntax analyzer 12 inputs the processing result of the lexical analyzer 11, and then performs syntax analysis. In the "syntax analysis" performed by the syntax analyzer 12, it is checked whether or not the instructions divided into the tokens, such as the variables or the symbols, by the lexical analyzer 11 conform to the grammatical rules defined in each programming language. The syntax analyzer 12 further analyzes whether or not the instructions or a combination of the instructions divided into the tokens defines a user-defined intrinsic function and details of processing operations of the user-defined intrinsic function. Then, The syntax analyzer 12 stores the user-defined intrinsic function and the details of the processing operations of the user-defined intrinsic function into a symbol table 20 (intrinsic function definition database).

Then, after intermediate code generation by the intermediate code generator 13 and intermediate code optimization by the intermediate code optimizer 14, the code generator 15 generates code. In the "code generation" performed by the code generator 15a, in response to division of the source program 1 into minimum units and the results of the check for syntax errors, a code generation function is used to perform processing that converts the source program 1 to an assembler format or binary format machine instructions.

Furthermore, the code optimizer 16 performs code optimization. At the "code optimization" stage performed by the code optimizer 16, the machine instructions generated by the immediately upstream code generator 15 are modified so as to improve the efficiency of actual processing. The code optimizer 16 further optimizes the machine instructions to machine instructions corresponding to the details of the processing operations of the user-defined intrinsic function, in a case where the string of the machine instructions generated by the code generator 15 are in agreement with the details of the processing operations of the intrinsic function stored in symbol table 20 (intrinsic function definition database).

The code output unit 17 then generates and outputs object code 2 based on the results of the code optimization performed by the code optimizer 16.

The reason that the compiler 10 generates the intermediate code by the intermediate code generator 13 and the intermediate code optimizer 14 is that, if the code generation is performed immediately after the syntax analysis, there are cases in which the size of the generated program would be very large and conversion processing cannot be performed efficiently. For this reason, the conversion of the intermediate code, which is a simple language, equivalent to the source program 1 is first done, before the translation processing is performed. It will be understood, however, that the object code 2 would be obtained even if the generation of intermediate code and the intermediate code optimization were omitted.

Figure 3:
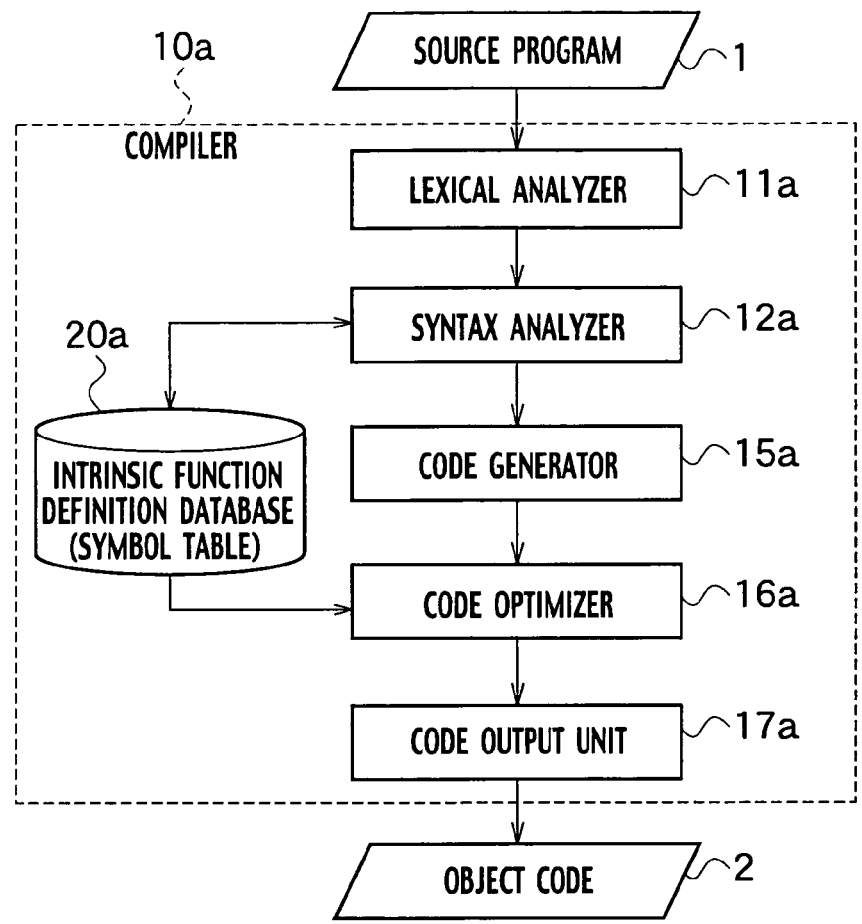
FIG. 3 is a simplified block diagram showing an example of the configuration of an intermediate code non-generating type compiler.

FIG. 3 is a drawing showing the configuration of an intermediate code non-generating type compiler 10a for generating object code 2 from a source program 1. As shown in FIG. 3, the compiler 10a generates the object code 2 from the source program 1 via a lexical analyzer 11a, a syntax analyzer 12a, a code generator 15a, a code optimizer 16a, and finally a code output unit 17a. The syntax analyzer 12a analyzes whether or not instructions or a combination of the instructions divided into the tokens by the lexical analyzer 11a defines a user-defined intrinsic function and details of processing operations of the user-defined intrinsic function, and then stores the user-defined intrinsic function and the details of the processing operations of the user-defined intrinsic function into a symbol table 20. The code optimizer 16a optimizes the machine instructions to machine instructions corresponding to the details of the processing operations of the user-defined intrinsic function, in a case where a string of machine instructions generated by the code generator 15a are in agreement with the details of the processing operations of the intrinsic function stored in the symbol table 20.

FIRST EMBODIMENT

In a processor expandable (configurable) user specifications such as a processor architecture, an instruction set or the like, in order to achieve a hardware operation according to the extended specifications, a user is allowed to define an intrinsic function individually. Hereafter, C programming language will be used to explain the first embodiment as a model of a programming language.

FIGS. 5A and 5B show examples of intrinsic functions defined according to user extended specifications. In addition, FIG. 6A shows an example of description of a string of instructions for calling explicitly the user-defined intrinsic function shown in FIG. 5A or 5B, and FIG. 6B shows a string of machine language generated from the string of instructions shown in FIG. 6A. Further, FIG. 7A shows a string of instructions to perform processing operations equivalent to the user-defined intrinsic functions shown in FIGS. 5A and 5B. FIG. 7B shows a string of machine language without optimization, generated from the string of instructions shown in FIG. 7A. FIG. 7C shows a string of machine language after the optimization, generated from the string of instructions shown in FIG. 7A.

In the intrinsic function definition F11 shown in FIG. 5A, the intrinsic function "uci" is declared and attributes of parameters are defined by using unique reserved words such as "_asm" and "_reg_src", and details of processing operations P11 of the intrinsic function "uci" are defined by using the C programming language. The intrinsic function definition F12 shown in FIG. 5B re-defines the intrinsic function definition F11 shown in FIG. 5A, and defines details of processing operations P12 of the intrinsic function "uci" by different description from the details of the processing operations P11 shown in FIG. 5A. That is, although the description methods of details of the processing operations differ, the intrinsic functions shown in FIGS. 5A and 5B have equivalent details of the processing operations as a result.

Thus, since the re-definitions of the user-defined intrinsic function are enabled any number of times (any number of kinds), the code optimizer 16 of the compiler 10 can specify easily strings of the instructions to be optimized as the number of the re-defined definitions increases.

Figure 4:
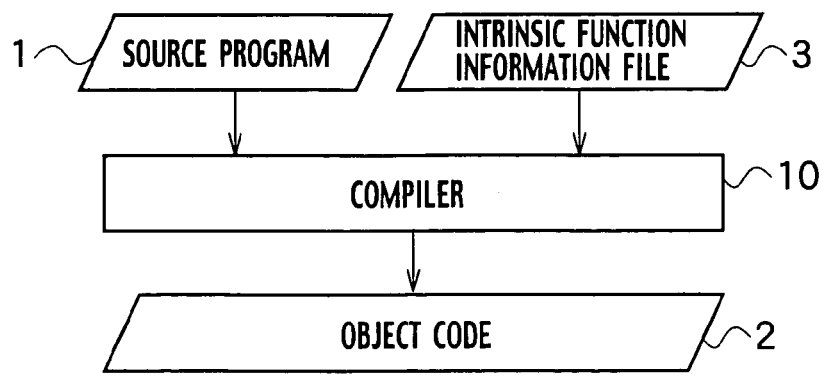
FIG. 4 is a simplified block diagram showing an example of the configuration of a compiler which inputs an intrinsic function definition from an intrinsic function information file.

The compiler 10 generates no object code 2 from the descriptions of the user-defined intrinsic function as shown in FIGS. 5A and 5B. Therefore, the intrinsic function definition can be described to a header file of the source program 1. Or as shown in FIG. 4, the intrinsic function definition is stored in a file (intrinsic function information file 3) different from the source program 1, and then the compiler 10 (syntax analyzer 12) can also read and compile the definition of the user-defined intrinsic function from the intrinsic function information file 3.

In addition, since the user-defined inclusion function can be defined by only adding few reserved words (such as "_asm", "_reg_src" or the like), if the intrinsic function definition is described in the source program 1, the user can easily understand the details of the processing operations of the intrinsic function and can easily create programs to be easily optimized based on the definition of the processing operations of the intrinsic function. Furthermore, the user can also manage the source program 1 easily.

Figure 8:
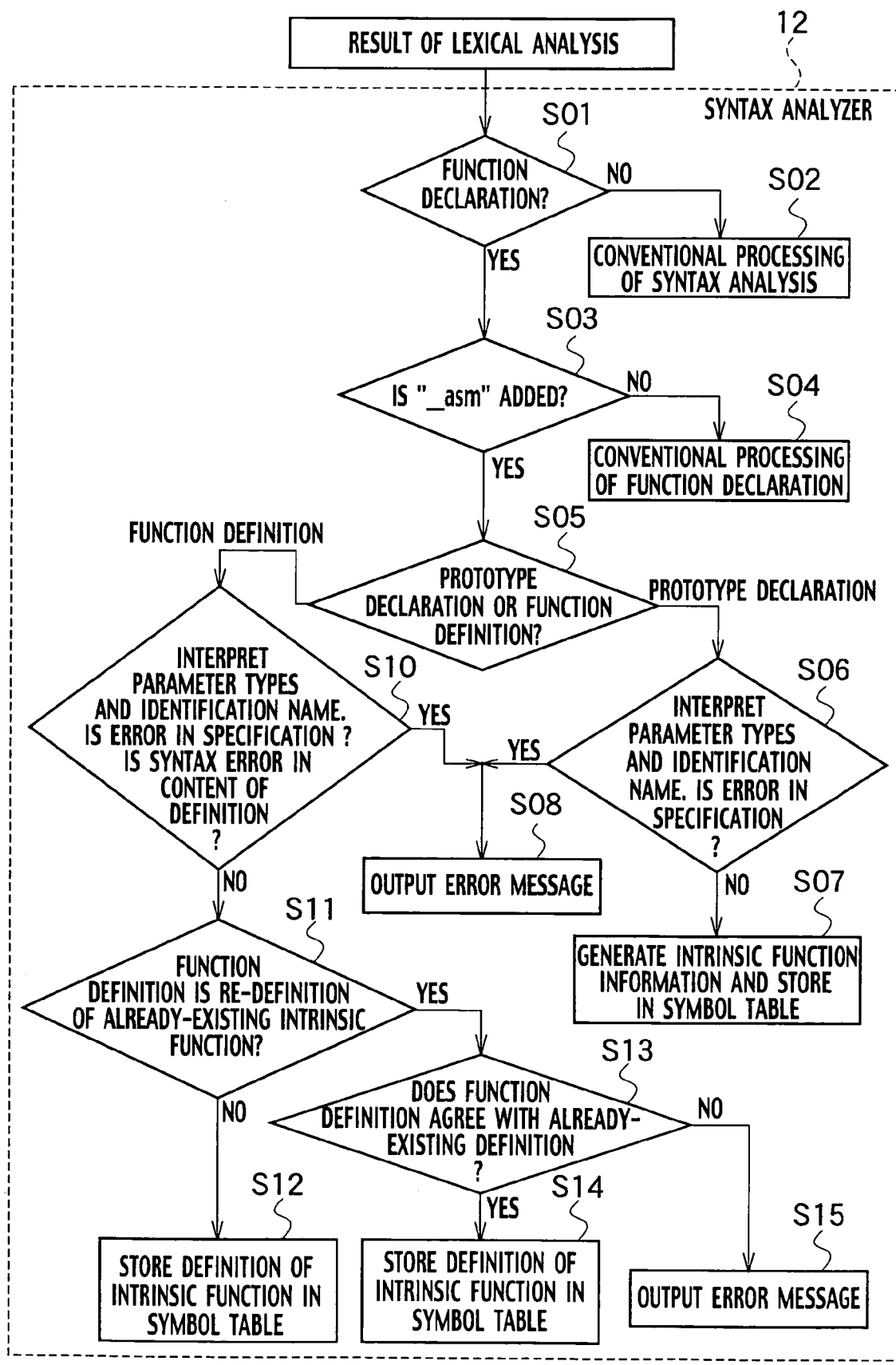
FIG. 8 is a flow chart showing an example of a processing procedure performed by a syntax analyzer in the compiler according to the first embodiment.

FIG. 8 is a flow chart showing an example of a detailed processing procedure performed by the syntax analyzer 12 of the compiler 10.

The syntax analyzer 12 inputs the processing result of the lexical analyzer 11, and then performs syntax analysis on the inputted tokens as shown in FIG. 8.

In Step S01, the syntax analyzer 12 discriminates whether or not the inputted token is function declaration. As a result of the discrimination, if the inputted token is not the function declaration, in Step S02, the syntax analyzer 12 performs the conventional processing of the syntax analysis.

As a result of the discrimination in Step S01, if the inputted token is the function declaration, in Step S03, the syntax analyzer 12 discriminates whether or not "_asm" is added to the function declaration. As a result of the discrimination, if the "_asm" is not add to the function declaration, the syntax analyzer 12 determines that this function declaration is not a declaration of the user-defined intrinsic function, and then performs the conventional processing of the function declaration in Step S04.

As a result of the discrimination in Step S03, if the "_asm" is add to the function declaration, the syntax analyzer 12 determines that this function declaration is a declaration of the user-defined intrinsic function, and then discriminates whether the declaration of the user-defined intrinsic function is a prototype declaration or a function definition in Step S05. At this point, the "prototype declaration" means a declaration of an intrinsic function which defines only the information of the parameter types and the name of the identifier, and does not have the definition of the details of the processing operations, among the user-defined intrinsic functions.

As a result of the discrimination in Step S05, if the declaration of the user-defined intrinsic function is a prototype declaration, in Step S06, the syntax analyzer 12 interprets the information of the parameter types and the name of the identifier, and then discriminates whether or not there is an error in the specifications of the information of the parameter types and the name of the identifier. As a result of the discrimination, if there is no error in the specifications of the information of the parameter types and the name of the identifier, in Step S07, the syntax analyzer 12 stores the definition of the details of the user-defined intrinsic function in the symbol table 20.

On the other hand, as a result of the discrimination in Step S06, if there is an error in the specifications of the information of the parameter types or the name of the identifier, in Step S08, the syntax analyzer 12 outputs a predetermined error message.

As a result of the discrimination in Step S05, if the declaration of the user-defined intrinsic function is not a prototype declaration, in Step S10, the syntax analyzer 12 interprets the information of the parameter types and the name of the identifier, and then discriminates whether or not there is an error in the specifications of the information of the parameter types and the name of the identifier and further discriminates whether or not there is a syntax error in the definition of the details of the intrinsic function. As a result of the discrimination in Step S10, if there is an error in the specifications of the information of the parameter types or the name of the identifier or there is a syntax error in the definition of the details of the intrinsic function, in Step S08, the syntax analyzer 12 outputs a predetermined error message.

As a result of the discrimination in Step S10, if there is no error in the specifications of the information of the parameter types and the name of the identifier and there is no syntax error in the definition of the details of the intrinsic function, in Step S11, the syntax analyzer 12 discriminates whether or not the definition of the user-defined intrinsic function is re-definition of already-existing intrinsic function stored in the symbol table 20. As a result of the discrimination, if the definition of the user-defined intrinsic function is not re-definition of already-existing intrinsic function, in Step S12, the syntax analyzer 12 stores the user-defined intrinsic function and the details definition of the user-defined intrinsic function in the symbol table 20.

As a result of the discrimination in Step S11, if the definition of the user-defined intrinsic function is re-definition of already-existing intrinsic function, in Step S13, the syntax analyzer 12 discriminates whether or not the definition of the processing operations of the user-defined intrinsic function is in agreement with the definition of the processing operations of the already-existing intrinsic function. If the definitions of the processing operations are virtually in agreement, for example, such as between the function definition of FIG. 5A and the function definition of FIG. 5B, in Step S14, the syntax analyzer 12 stores the user-defined intrinsic function and the details definition of the user-defined intrinsic function in the symbol table 20.

On the other hand, as a result of the discrimination in Step S13, if the definitions of the processing operations are not virtually in agreement, in Step S15, the syntax analyzer 12 outputs a predetermined error message.

In addition, the discrimination between the definition of the processing operations of the user-defined intrinsic function and the definition of the processing operations of the already-existing intrinsic function in Step S11 is achieved by "detection of common formula" technology used with the conventional compiler.

Figure 9:
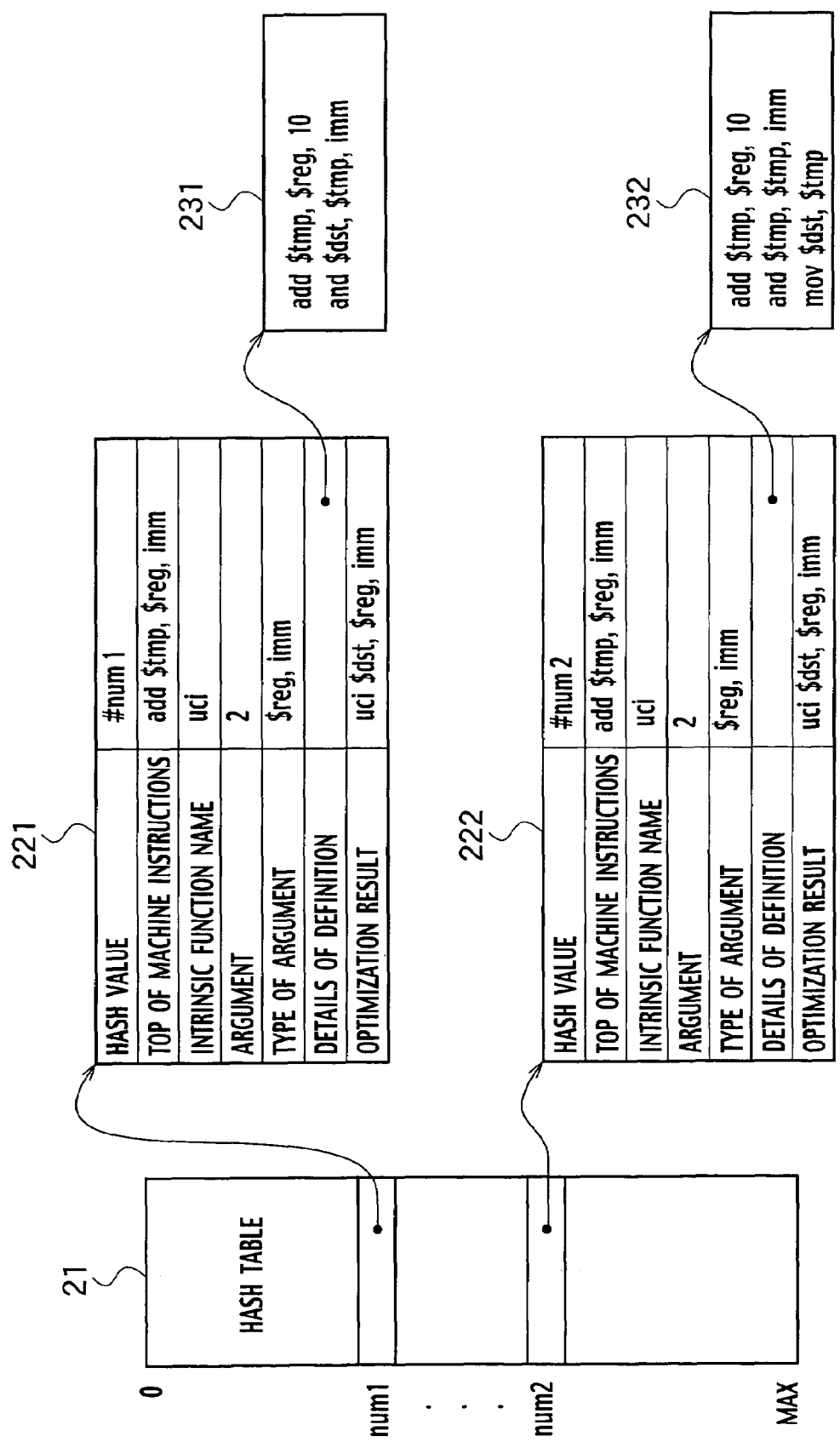
FIG. 9 shows an example of a symbol table created by the processing of the syntax analyzer shown in FIG. 8.

Above processing is performed by the syntax analyzer 12 to the intrinsic function definitions shown in FIG. 5A and FIG. 5B, as a result, data shown in FIG. 9 is stored in the symbol table 20.

As shown in FIG. 9, each definition tables 221, 222, . . . of the intrinsic functions is stored in the location to which each hash values in the hash table 21 points in the symbol table 20. The hash value, top of the machine instructions, the intrinsic function name, the argument, type of the argument, the definition of the details of the processing operations 231, 222, . . . , and the optimization result are stored in each definition tables 221, 222, . . . . Thus, the conversion processing from the machine instructions to the user-defined intrinsic function, performed by the syntax analyzer 12 and the code optimizer 16, is achieved.

Figure 10:
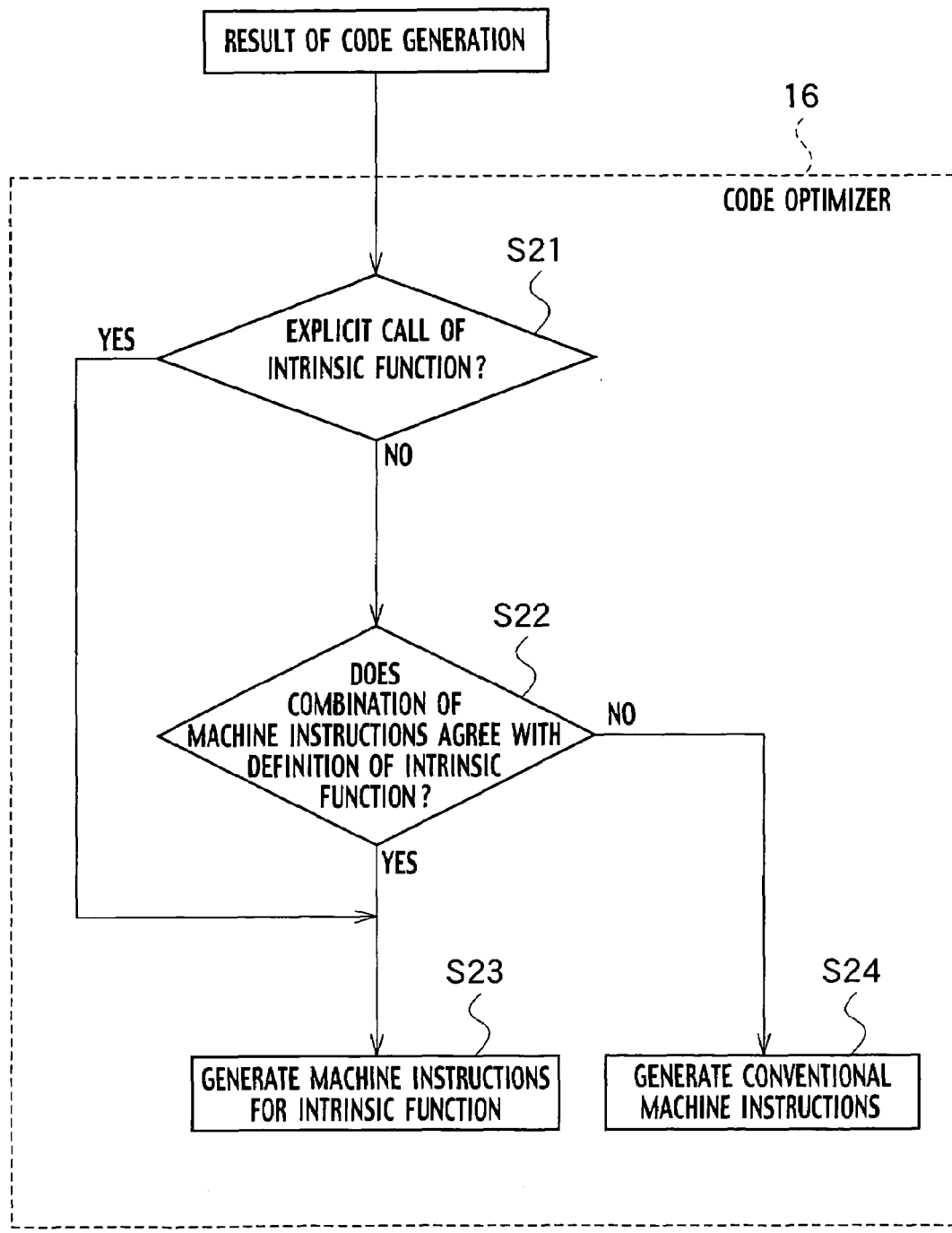
FIG. 10 is a flow chart showing an example of a processing procedure performed by a code optimizer in the compiler according to the first embodiment.

FIG. 10 is a flow chart showing an example of a detailed processing procedure performed by the code optimizer 16.

First, in Step S21, the code optimizer 16 discriminates whether or not the machine instructions generated by the code generator 15 are the explicit call of the user-defined intrinsic function. As a result of the discrimination, if the machine instructions generated by the code generator 15 are the explicit call of the user-defined intrinsic function as shown in FIG. 6A, in Step S23, the code optimizer 16 optimizes the machine instructions to machine instructions corresponding to the details of the processing operations of the user-defined intrinsic function "uci" as shown in FIG. 6B.

As a result of the discrimination in Step S21, if the machine instructions generated by the code generator 15 are not the explicit call of the user-defined intrinsic function as shown in FIG. 7A, in Step S22, the code optimizer 16 determines whether or not each of the machine instructions M21 and M22 corresponding to each of the instruction statement T21 and T22 shown in FIG. 7A is agreement with the definition of the details of processing operations of the intrinsic function stored in the symbol table 20 respectively.

More specifically explaining about the string of the machine instructions M21, the string of the machine instructions M21 is in agreement with the details definition corresponding to the first definition (#num 1) of the intrinsic function "uci" stored in the symbol table 20 shown in FIG. 9, as a result of performing hash reference to the top of the string of the machine instructions "add $3, $1, 10". Next, the string of the machine instructions M21 is similarly in agreement with the details definition corresponding to the first definition (#num 1) of the intrinsic function "uci", as a result of performing hash reference to the string of the machine instructions "add $4, $0, 10". Therefore, in Step S23, the string of the machine instructions M21 is optimized to the string of the machine instructions M23 shown in FIG. 7C corresponding to the definition of the processing operations of the intrinsic function "uci", and the optimized the string of the machine instructions is outputted.

Similarly, in Step S23, the string of the machine instructions M22 is optimized to the string of the machine instructions M24 shown in FIG. 7C corresponding to the definition of the processing operations of the intrinsic function "uci", and the optimized the string of the machine instructions is outputted.

As a result of determination in Step S22, if the combination of the machine instructions is not agreement with the definition of the details of the intrinsic function stored in the symbol table 20, in Step S24, the code optimizer 16 determines the machine instructions are conventional machine instructions, and then generates the conventional machine instructions. In the example shown in FIG. 7A, the strings of the machine instructions M21 and M22 shown in FIG. 7B are generated without being optimized.

As a processing result by the compiler 10 explained above, an example of the inputted source program 1 is shown in FIG. 11, and an example of the generated object code 2 (assembler code) is shown in FIG. 12.

As explained above, according to the first embodiment, it is possible to optimize the instruction statement, which performs the processing operations equivalent to the user-defined intrinsic functions, to the machine instructions according to this intrinsic function, even if the user does not describe the explicit calling of the user-defined intrinsic function in the source program 1.

Furthermore, since the re-definitions of the user-defined intrinsic function are enabled any number of times (any number of kinds), the instruction statements of candidates for converting to the machine instructions of the user-defined intrinsic function increases, and then it is possible to achieve more effective optimization.

SECOND EMBODIMENT

Although the example of describing the user-defined intrinsic function by using the C programming language is shown in the first embodiment, the programming language for describing the user-defined intrinsic function is not limited to the C programming language.

Therefore, the second embodiment shows an example of a complier 10 which inputs a user-defined intrinsic function described by using a hardware description language (HDL; for example, VerilogHDL), creates a symbol table 20, and optimizes instruction statements, which performs processing operations equivalent in a source program 1, to machine instructions according to the user-defined intrinsic function.

FIG. 13 shows an example of a user-defined intrinsic function (operation definition of instructions) described by using the VerilogHDL, including a string of instructions P41 of details of processing operations. A file name of the operation definition of the instructions is "add10_and__1.v".

Similarly, FIG. 14 shows an example of a user-defined intrinsic function (operation definition of instruction) described by using the VerilogHDL, including a string of instructions P42 of details of processing operations. A file name of the operation definition of the instructions is "add10_and__2.v".

In addition, the string of the instructions P41 of the details of the processing operations shown in FIG. 13 achieves processing equivalent to the string of the instructions P11 of the details of the processing operations shown in FIG. 11 in the first embodiment. Similarly, the string of the instructions P42 of the details of the processing operations shown in FIG. 14 achieves processing equivalent to the string of the instructions P12 of the details of the processing operations shown in FIG. 12. That is, the re-definitions of the operation definition of the instructions described by using the VerilogHDL are similarly enabled any number of times (any number of kinds) as in the case of the first embodiment.

FIG. 15A shows an example of the source program 1 inputted by the compiler 10. In the source program 1, declaration statements H41 and H42, an instruction statement T41, and an instruction statement T42 are described by using the C program language. The declaration statements H41 and H42 declare the operation definition files ("add10_and__1.v" and "add10_and__2.v") described by using the VerilogHDL. The instruction statement T41 calls explicitly the user-defined intrinsic function "uci". The instruction statement T42 achieves processing equivalent to the instruction statement T41.

Figure 16:
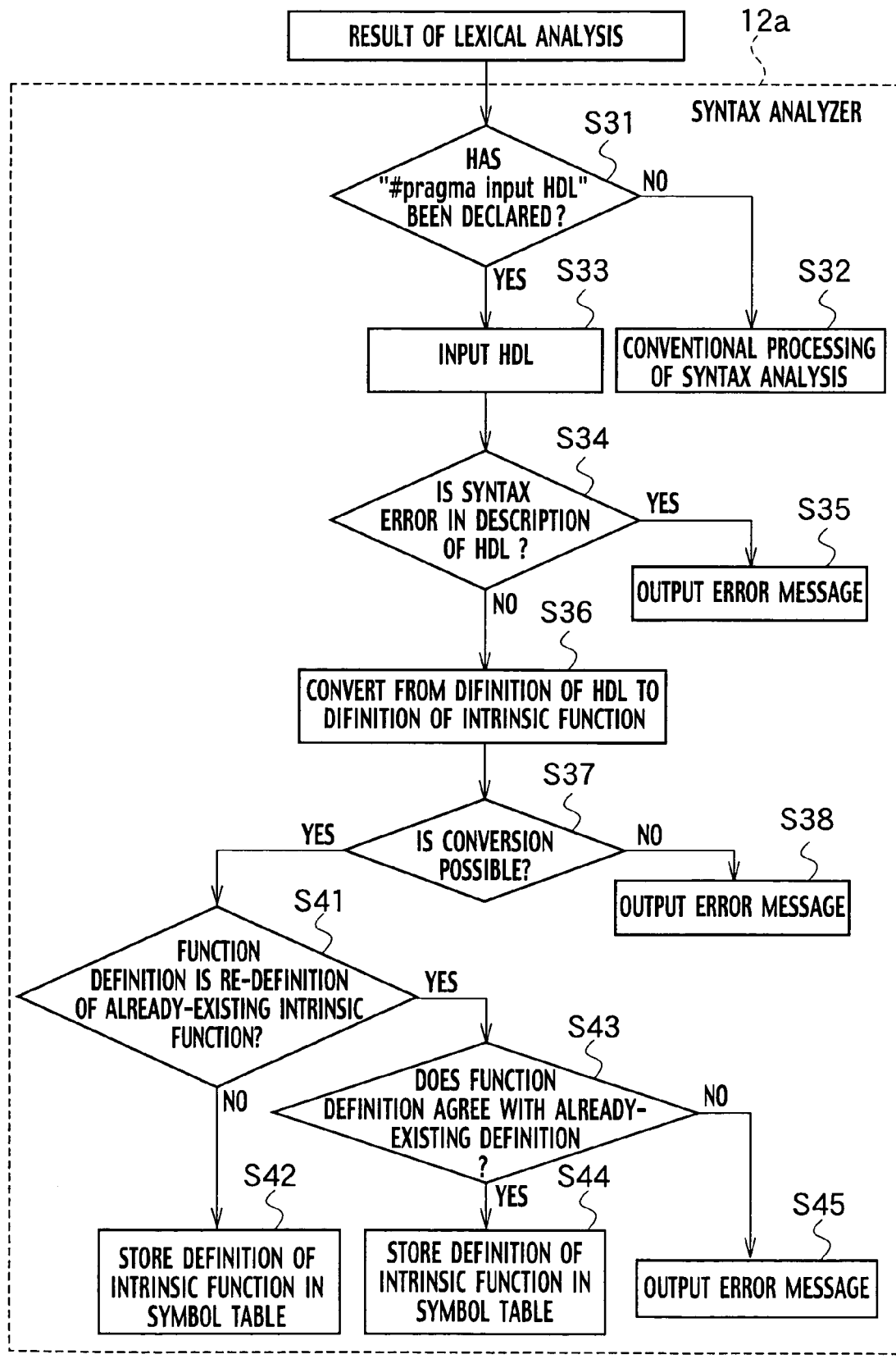
FIG. 16 is a flow chart showing an example of a processing procedure performed by a syntax analyzer in the compiler according to the second embodiment.

FIG. 16 shows an example of a processing procedure performed by a syntax analyzer 12a of the compiler 10 which inputs such the source program 1 shown in FIG. 15A.

As shown in FIG. 16, the syntax analyzer 12a inputs a processing result of the lexical analyzer 11. In Step 31, the syntax analyzer 12a discriminates whether or not the inputted token is declaration (such as "#pragma input HDL") of the operation definition file described by using the VerilogHDL. As a result of the discrimination, if the inputted token is not the declaration of the operation definition file, in Step S32, the syntax analyzer 12a performs the conventional processing of the syntax analysis.

As a result of the discrimination in Step S31, if the inputted token is the declaration of the operation definition file by the VerilogHDL, in Step S33, the syntax analyzer 12a inputs the operation definition file described by using the VerilogHDL. Then, in Step S34, the syntax analyzer 12a discriminates whether or not there is a syntax error in the inputted operation definition file.

As a result of the discrimination in Step S34, if there is a syntax error in the inputted operation definition file, in Step S35, the syntax analyzer 12a outputs a predetermined error message.

On the other hand, if there is no syntax error in the inputted operation definition file, in Step S36, the syntax analyzer 12a converts from the description of the operation definition described by using the VerilogHDL to description of a user-defined intrinsic function. For example, the operation definition of the instructions shown in FIG. 12a is converted to the intrinsic function definition F11 shown in FIG. 11, and the operation definition of the instructions shown in FIG. 13 is similarly converted to the intrinsic function definition F12 shown in FIG. 11.

In Step S37, if the conversion processing in Step S36 is not completed normally, the syntax analyzer 12a outputs a predetermined error message in Step S38.

On the other hand, if the conversion processing in Step S36 is completed normally, in Step S41, the syntax analyzer 12a discriminates whether or not the converted intrinsic function is re-definition of already-existing intrinsic function stored in the symbol table 20. As a result of the discrimination, if the converted intrinsic function is not re-definition of already-existing intrinsic function, in Step S42, the syntax analyzer 12a stores the converted intrinsic function and the details definition of the intrinsic function in the symbol table 20.

As a result of the discrimination in Step S41, if the converted intrinsic function is re-definition of already-existing intrinsic function, in Step S43, the syntax analyzer 12a discriminates whether or not the definition of the processing operations of the converted intrinsic function is in agreement with the definition of the processing operations of the already-existing intrinsic function. If the definitions of the processing operations are virtually in agreement, in Step S44, the syntax analyzer 12a stores the converted intrinsic function and the details definition of the converted intrinsic function in the symbol table 20.

On the other hand, as a result of the discrimination in Step S41, if the definitions of the processing operations are not virtually in agreement, in Step S45, the syntax analyzer 12a outputs a predetermined error message.

Figure 17:
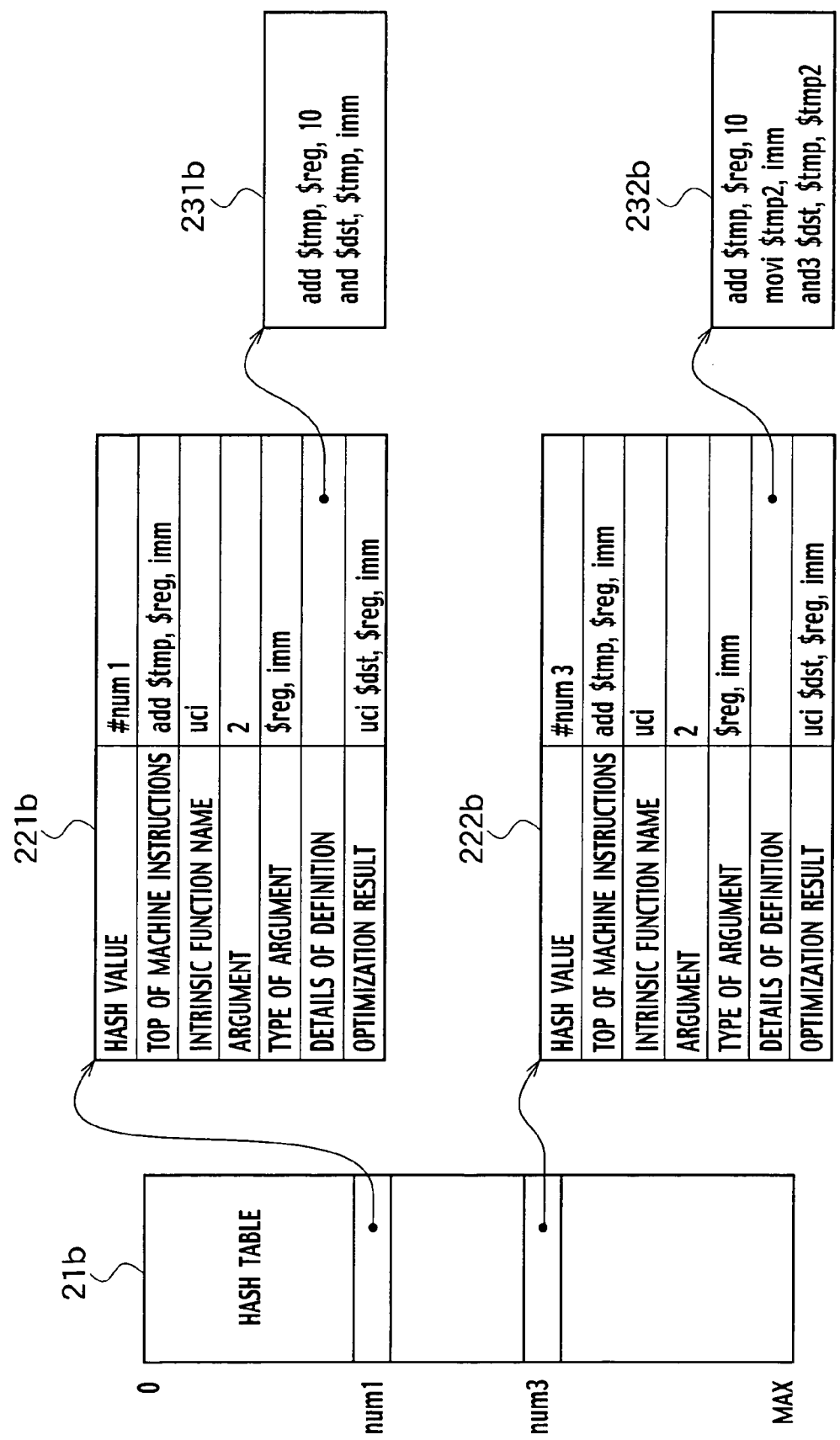
FIG. 17 shows an example of a symbol table created by the processing of the syntax analyzer shown in FIG. 16.

As a result of the above processing performed by the syntax analyzer 12a, data shown in FIG. 17 is stored in the symbol table 20. As a result, the data equivalent to the data shown in FIG. 9 is stored in the symbol table 20.

In addition, each composition element except the syntax analyzer 12a among the composition elements of a compiler 10 according to the second embodiment is the same as each composition element of the compiler 10 shown in FIG. 2 according to the first embodiment.

As a processing result performed by the compiler 10 explained above, the object code 2 (assembler code) shown in FIG. 12 is optimized and generated from the inputted source program 1 shown in FIG. 15A.

As explained above, according to the second embodiment, it is possible to optimize the instruction statement, which performs the processing operations equivalent to the user-defined intrinsic functions described by using the hardware description language, to the machine instructions corresponding to the user-defined intrinsic function.

Furthermore, the user can understand easily the method of mounting hardware by referring the definition of the user-defined intrinsic function described by using the hardware description language during the programming. Therefore, it is possible to optimize the processing operations of the program, based on the user extended specifications.

In addition, although the second embodiment shows the example that the syntax analyzer 12a performs the processing of the lexical and the syntax analysis (in Step S34) after the processing of inputting the HDL file (Step S33), the lexical analyzer 11 and the syntax analysis part 12a may perform the processing of the lexical and syntax analysis of the VerilogHDL. Thus, it is possible to describe mixing the VerilogHDL and other programming language in the source program 1.

THIRD EMBODIMENT

The third embodiment shows an example of a program development tool using the compiler 10 of the second embodiment. The program development tool can be used for, for example, designing a processor which installs user-defined hardware and an application program for designing the processor.

Figure 18:
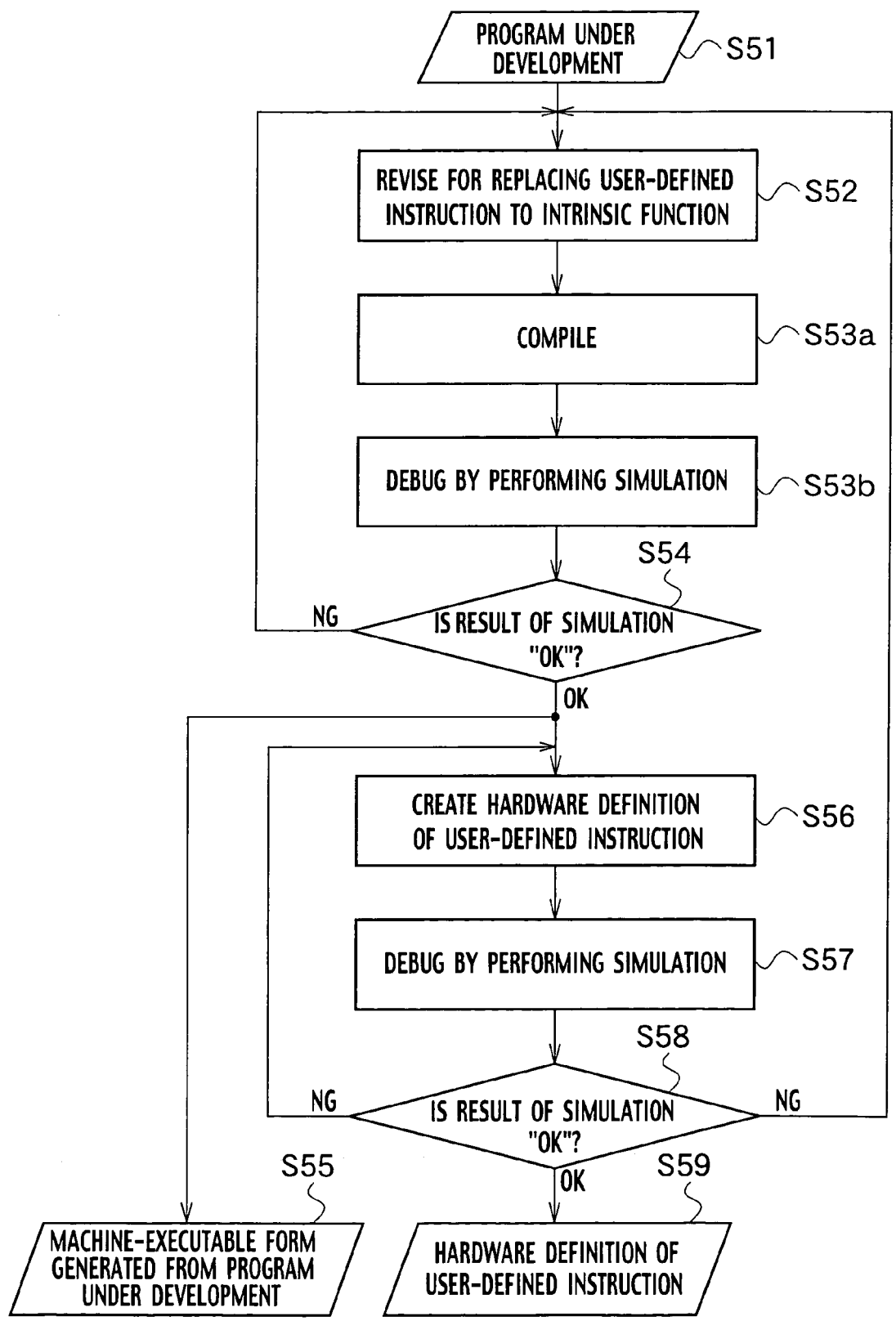
FIG. 18 is a flow chart showing an example of a processing procedure performed by a program development tool according to a comparison embodiment.

Before explaining the third embodiment, an example of processing operation of a program development tool using the compiler disclosed in above publication is shown in FIG. 18 as an example of comparison.

As shown in FIG. 18, in Step S51, the program development tool creates an application program. In Step S52, the program development tool revises the application program under development for replacing the applicable part of user-defined instructions to an intrinsic function describing user-defined instructions. In Step S53, the program development tool compiles the revised application program by using the complier disclosed in above publication. In Step S54, the program development tool debugs the compiled application program by performing simulation.

If the simulation result of Step 53 is undesirable, the program development tool returns this processing to Step S52 and redesigns from the processing which replaces the user-defined instructions to the user-defined intrinsic function.

If the simulation result of Step 53 is desirable, in Step S55, the program development tool provides machine-executable formed object code generated from the revised application program under development. On the other hand, in Step S56, the program development tool further creates hardware definition of the user-definition instructions based on the completed application program under development, and debugs by performing the simulation in Step S57.

If the simulation result of Step 57 is undesirable, the program development tool returns this processing to Step S52; and redesigns from the processing which replaces the user-defined instructions to the user-defined intrinsic function, or returns this processing to Step S56 and redesigns from the processing which creates the hardware definition of the user-defined instructions.

If the simulation result of Step 56 is desirable, in Step S59, the program development tool provides the completed hardware definition of the user-defined instructions.

In contrast to the program development tool of the above examples of comparison, a program development tool according to the third embodiment will be explained hereafter referring the flow chart of FIG. 19.

Figure 19:
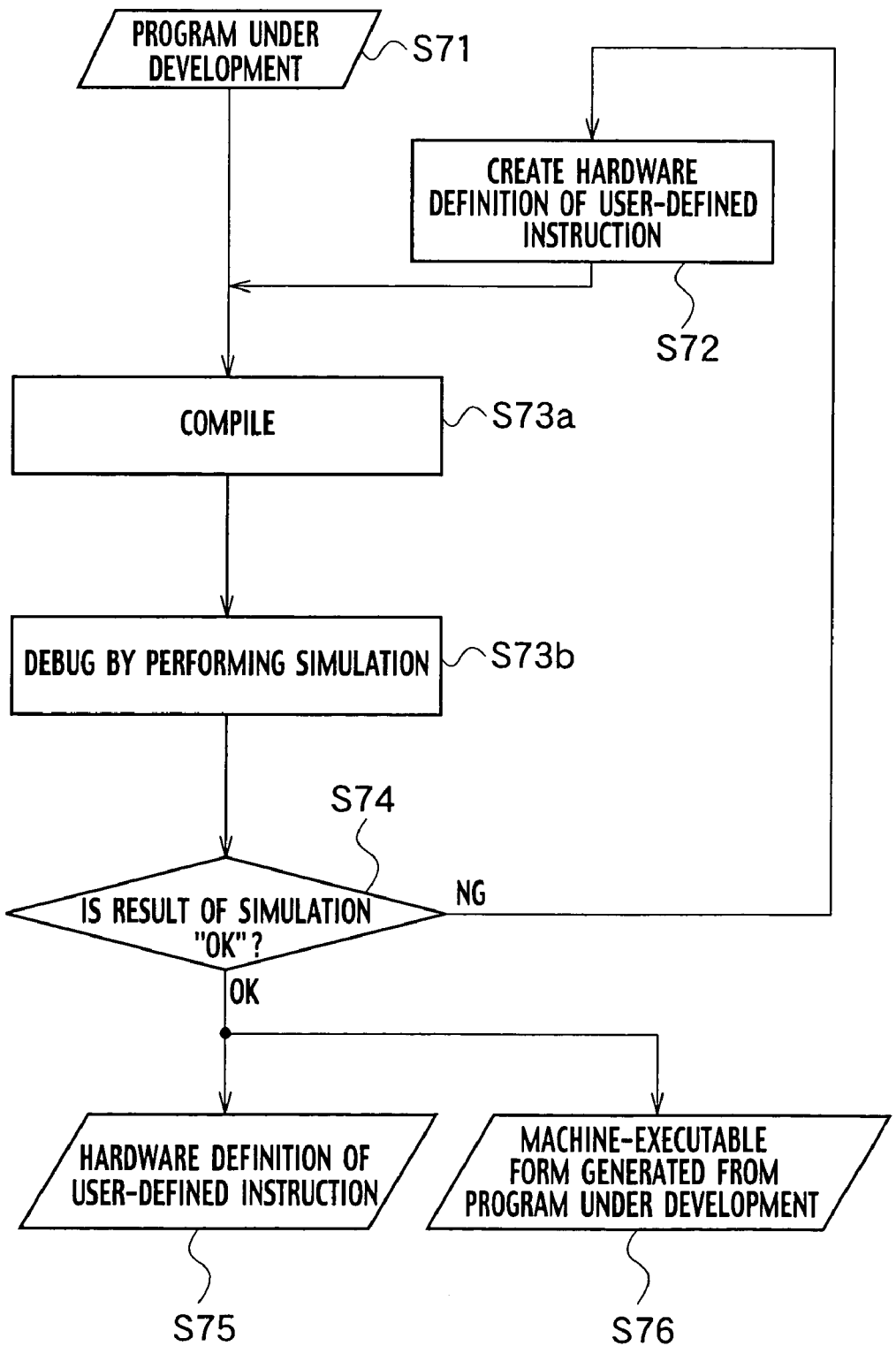
FIG. 19 is a flow chart showing an example of a processing procedure performed by a program development tool according to a third embodiment.

As shown in FIG. 19, in Step S71, the program development tool according to the third embodiment creates an application program under development such as shown in FIG. 15A. On the other hand, in Step S72, the program development tool further creates hardware definition of user-defined instructions as shown in FIG. 13 and FIG. 14.

Then, in Step S73a, the program development tool compiles the application program created in Step S71 by using the complier 10 according to the second embodiment. More specifically, the syntax analyzer 12a inputs the hardware definition of the user-defined instructions, converts from the hardware definition to definition details of user-defined intrinsic function, and stores the user-defined intrinsic function and the definition details of the user-defined intrinsic function in the symbol table 20.

After that, the code optimizer 16 determines whether or not the machine instructions generated by the code generator 15 are agreement with the details of processing operations of the intrinsic function stored in the symbol table 20. As a result of the determination, if the machine instructions are agreement with the details of the processing operations of the intrinsic function, the code optimizer 16 optimizes the machine instructions to machine instructions corresponding to the details of the processing operations of the user-defined intrinsic function.

In Step S73b, the program development tool debugs the compiled application program by performing the simulation.

If the simulation result of Step 73b is undesirable, the program development tool returns this processing to Step S72 and redesigns from the processing which creates the hardware definition of the user-defined instructions.

If the simulation result of Step 56 is desirable, the program development tool provides machine-executable formed object code generated from the revised application program under development in Step S76, and further provides the completed hardware definition of the user-defined instructions in Step S75.

As explained above, according to the program development tool of the third embodiment, it is possible to design the processor which installs the user-defined hardware and the application program for the processor, by the easy processing procedure as compared with the program development tool shown in the example of comparison.

Further, the user can program without being conscious of the user-defined hardware during the programming of the source program 1. Furthermore, the user does not need to replace the program description of the applicable portion defined by the user to an intrinsic function, after introducing the user-defined hardware into the specifications of the processor. Therefore, it is possible to prevent the mistake accompanying replacement, and thus to reduce the time required for the development.

Although the embodiments of the present invention have been described in detail, the present invention may be embodied in other specific forms without departing from the spirit or essential characteristics thereof.

In the above embodiments, for example, although the compiler 10 for compiling the source program 1 described by using the C programming language is explained above, the programming language is not limited to the C programming language. For example, the source program described by using the C++ language or the like also can be compiled similarly.

Furthermore, in the above embodiments, the intrinsic function defined by using the reserved word "_asm" or the reserved word "_reg_src" is explained above, the user-defined intrinsic function can be defined by using other words or phrases, except for the reserved words specified to the programming language to be used.

The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

According to the above embodiments, it is possible to provide the complier, the method of compiling and the program development tool, which can optimize the instruction statement, which performs the processing operations equivalent to the user-defined intrinsic functions, to the machine instructions according to the intrinsic function, even if the explicit calling of the user-defined intrinsic function is not described in the source program.

What is claimed is:

1. A memory configured to store a program, which when executed by a computer, causes the computer to perform a method of compiling for generating object code from an input source program, the object code including user-defined machine instructions defined by a user, the method comprising:

analyzing, by a syntax analyzer, whether or not an operation described in the source program conforms to grammatical rules, outputting, by the syntax analyzer, a result of the analysis as an syntax-analysis result, and associating, by the syntax analyzer, the details of the processing operations with the user-defined machine instructions and storing the associated details of the processing operations and user-defined machine instructions in an intrinsic function definition database when detecting that the combination of the instructions is a function definition of the intrinsic function which defines the details of the processing operations associated so as to be converted into the user-defined machine instruction;

generating, by a code generator, multiple machine instructions from the source program based on the syntax-analysis result of the syntax analyzer; and replacing, by a code optimizer, the multiple machine instructions by a user-defined machine instruction stored in the intrinsic function definition database in the case where the multiple machine instructions generated from the input source program by the code generator are determined to exactly match the machine instructions generated from the details of an intrinsic function definition body of the user-defined machine instruction, wherein an instruction statement for explicitly calling the intrinsic function which defines aforementioned details of the processing operations is not beforehand described in a body of the input source program since the definition of the intrinsic function is provided independently from the input source program, and the program for compiling generates no object code from the intrinsic function.

2. The memory of claim 1, further comprising dividing, by a lexical analyzer, the operations described in the source program into tokens, wherein the syntax analyzer analyzes whether or not the tokens conforms to grammatical rules, and analyzes whether or not the combination of the tokens is a function definition of the intrinsic function.

3. The memory of claim 1, wherein the syntax analyzer inputs the definition of the intrinsic function and the details of the processing operations of the intrinsic function from an intrinsic function information file different from the source program.

4. The memory of claim 1, wherein the definition of the intrinsic function includes information of parameter types and an identification name.

5. The memory of claim 2, wherein the definition of the intrinsic function includes information of parameter types and an identification name.

6. The memory of claim 3, wherein the definition of the intrinsic function includes information of parameter types and an identification name.

7. The memory of claim 1, wherein in the intrinsic function definition database, plural kind of details of the processing operations can be defined for one intrinsic function.

8. The memory of claim 2, wherein in the intrinsic function definition database, plural kind of details of the processing operations can be defined for one intrinsic function.

9. The memory of claim 3, wherein in the intrinsic function definition database, plural kind of details of the processing operations can be defined for one intrinsic function.

10. The memory of claim 4, wherein in the intrinsic function definition database, plural kind of details of the processing operations can be defined for one intrinsic function.

11. The memory of claim 1, wherein the definition of the intrinsic function and the details of the processing operations of the intrinsic function can be described by C language.

12. The memory of claim 1, wherein the definition of the intrinsic function and the details of the processing operations of the intrinsic function can be described by hardware description language.

13. A computer implemented method of compiling for generating object code from an input source program, the object code including user-defined machine instructions defined by a user, the computer implemented method comprising:

analyzing, by a syntax analyzer, whether or not an operation described in the source program conforms to grammatical rules, outputting, by the syntax analyzer, a result of the analysis as an syntax-analysis result, and associating, by the syntax analyzer, the details of the processing operations with the user-defined machine instructions and storing the associated details of the processing operations and user-defined machine instructions in an intrinsic function definition database when detecting that the combination of the instructions is a function definition of the intrinsic function which defines the details of the processing operations associated so as to be converted into the user-defined machine instruction;

generating, by a code generator, multiple machine instructions from the source program based on the syntax-analysis result of the syntax analyzer; and replacing, by a code optimizer, the multiple machine instructions by a user-defined machine instruction stored in the intrinsic function definition database in the case where the multiple machine instructions generated from the input source program by the code generator are determined to exactly match the machine instructions generated from the details of an intrinsic function definition body of the user-defined machine instruction, wherein an instruction statement for explicitly calling the intrinsic function which defines aforementioned details of the processing operations is not beforehand described in a body of the input source program since the definition of the intrinsic function is provided independently from the input source program, and no object code is generated from the intrinsic function.

14. The computer implemented method of claim 13, further comprising dividing, by a lexical analyzer, the operations described in the source program into tokens, wherein in the analyzing by the syntax analyzer, whether or not the tokens conforms to grammatical rules is analyzed, and whether or not the combination of the tokens is a function definition of the intrinsic function is analyzed.

15. The computer implemented method of claim 13, wherein the definition of the intrinsic function and the details of the processing operations of the intrinsic function are inputted, by the syntax analyzer, from an intrinsic function information file different from the source program.

16. The computer implemented method of claim 13, wherein the definition of the intrinsic function including information of parameter types and an identification name are analyzed by the syntax analyzer and stored in the intrinsic function definition database.

17. The computer implemented method of claim 13, wherein in the intrinsic function definition database, plural kind of details of the processing operations can be defined for one intrinsic function.

18. The computer implemented method of claim 13, wherein the definition of the details of the processing operations of the intrinsic function described by C language is analyzed by the syntax analyzer.

19. The computer implemented method of claim 13, wherein the definition of the intrinsic function and the details of the processing operations of the intrinsic function described by hardware description language is analyzed by the syntax analyzer.

20. A computer implemented program development system for developing an application program for a processor which can execute user-defined machine instructions defined by a user, the computer implemented program development system comprising:

a compile apparatus for generating object code from the application program comprising a lexical analyzer configured to divide an operation described in a source code of the application program into tokens, a syntax analyzer configured to analyze whether or not the tokens conform to grammatical rules, output a result of the analysis as an syntax-analysis result, and associate the details of the processing operations with the user-defined machine instructions and store the associated details of the processing operations and user-defined machine instructions in an intrinsic function definition database when detecting that the combination of the instructions is a function definition of the intrinsic function which defines the details of the processing operations associated so as to be converted into the user-defined machine instruction, a code generator configured to generate multiple machine instructions from the application program based on the syntax-analysis result of the syntax analyzer, and a code optimizer configured to optimize the multiple machine instructions by a user-defined machine instruction stored in the intrinsic function definition database in the case where the multiple machine instructions generated from the input source program by the code generator are determined to exactly match the machine instructions generated from the details of an intrinsic function definition body of the user-defined machine instruction; and a simulator apparatus configured to simulate the application program including the machine instruction output from the compile apparatus, wherein an instruction statement for explicitly calling the intrinsic function which defines aforementioned details of the processing operations is not beforehand described in a body of the input source program since the definition of the intrinsic function is provided independently from the input source program, and the compile apparatus generates no object code from the intrinsic function.

\* \* \* \* \*